United States Patent [19]

Hannah et al.

[11] Patent Number: 5,706,481
[45] Date of Patent: Jan. 6, 1998

[54] APPARATUS AND METHOD FOR INTEGRATING TEXTURE MEMORY AND INTERPOLATION LOGIC IN A COMPUTER SYSTEM

[75] Inventors: Marc R. Hannah, Los Altos; Michael B. Nagy, San Ramon, both of Calif.

[73] Assignee: Silicon Graphics, Inc., Mountain View, Calif.

[21] Appl. No.: 650,117

[22] Filed: May 22, 1996

Related U.S. Application Data

[63] Continuation of Ser. No. 206,959, Mar. 7, 1994, Pat. No. 5,548,709.

[51] Int. Cl.$^6$ ........................................ G06F 15/76
[52] U.S. Cl. .................. 395/519; 395/503; 395/523; 395/130
[58] Field of Search ........................ 395/118, 129, 395/130, 501–526; 345/149, 152, 153, 185, 186

[56] References Cited

U.S. PATENT DOCUMENTS

| | | | |
|---|---|---|---|
| 4,945,500 | 7/1990 | Deering | 395/122 |
| 5,179,638 | 1/1993 | Dawson et al. | 395/125 |
| 5,185,856 | 2/1993 | Alcorn et al. | 395/130 |
| 5,222,205 | 6/1993 | Larson et al. | 395/130 |
| 5,392,393 | 2/1995 | Deering | 395/505 |
| 5,493,643 | 2/1996 | Soderberg et al. | 395/505 |
| 5,517,611 | 5/1996 | Deering | 395/503 |
| 5,519,823 | 5/1996 | Barkans | 395/143 |
| 5,548,709 | 8/1996 | Hannah | 395/510 |

OTHER PUBLICATIONS

G. Dunnett, M. White, P. Lister, R. Grimsdale, "The Image Chip for High Performance 3D Rendering", IEEE Computer Graphics and Application, vol. 12, No. 6, Nov. 1992, pp. 41–52.

T. Williams, "80860 May Force Rethinking of Graphics System Architectures", Computer Design, May 1, 1989, pp. 43–47.

*Primary Examiner*—Mark R. Powell
*Assistant Examiner*—U. Chauhan
*Attorney, Agent, or Firm*—Blakely, Sokoloff, Taylor & Zafman

[57] ABSTRACT

In a computer graphics system, a semiconductor chip used in performing texture mapping. Textures are input to the semiconductor chip. These textures are stored in a main memory. Cache memory is used to accelerate the reading and writing of texels. A memory controller controls the data transfers between the main memory and the cache memory. Also included within the same semiconductor chip is an interpolator. The interpolator produces an output texel by interpolating from textures stored in memory. The interpolated texel value is output by the semiconductor chip, thereby minimizing transmission bandwidth as well as redundant storage of texture maps in a multi-processor environment.

18 Claims, 11 Drawing Sheets

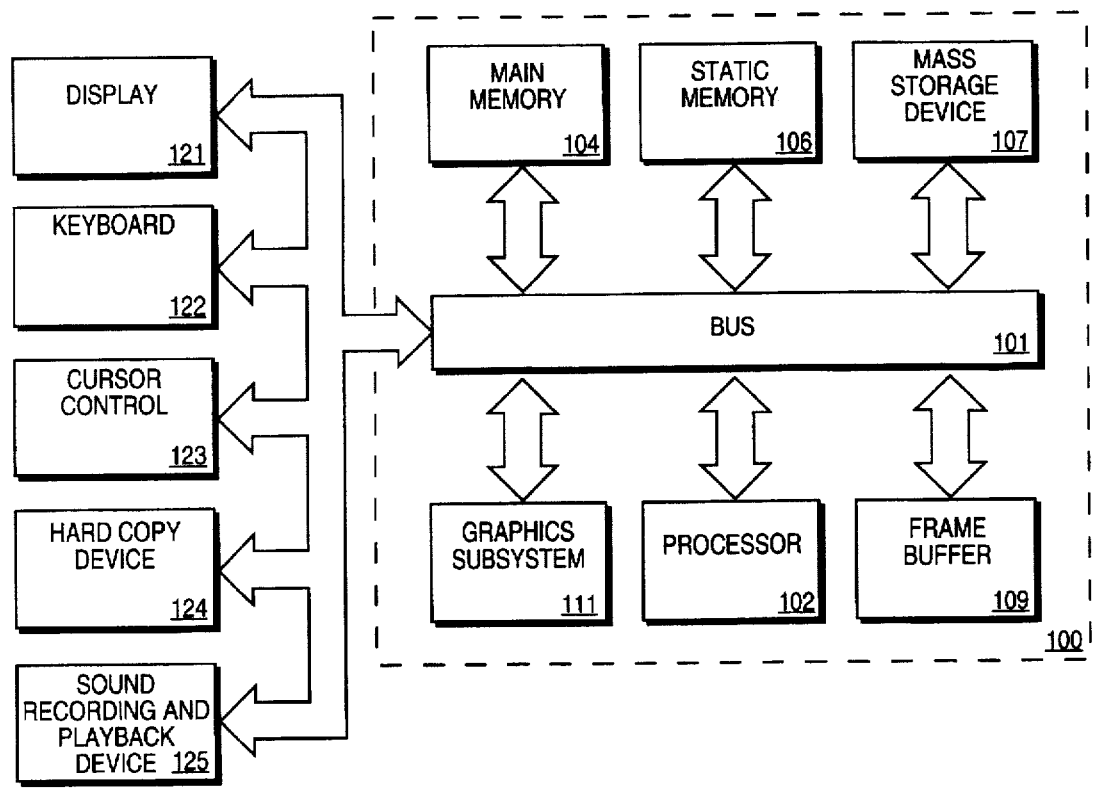
FIG_1

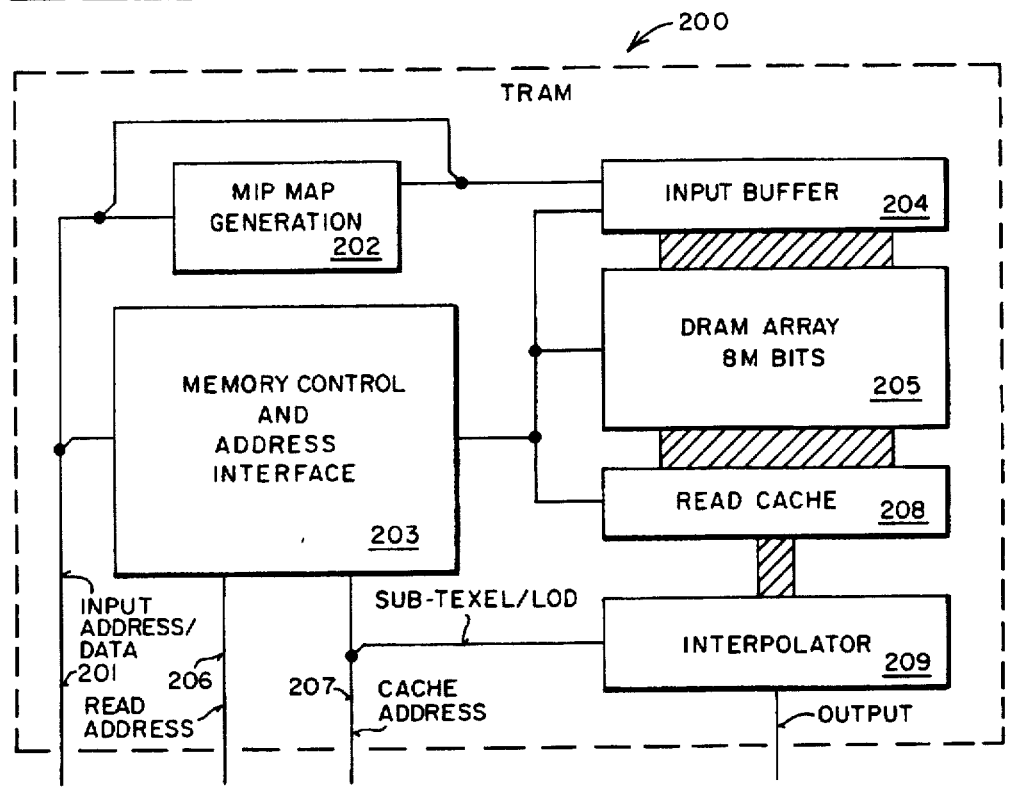
FIG_2
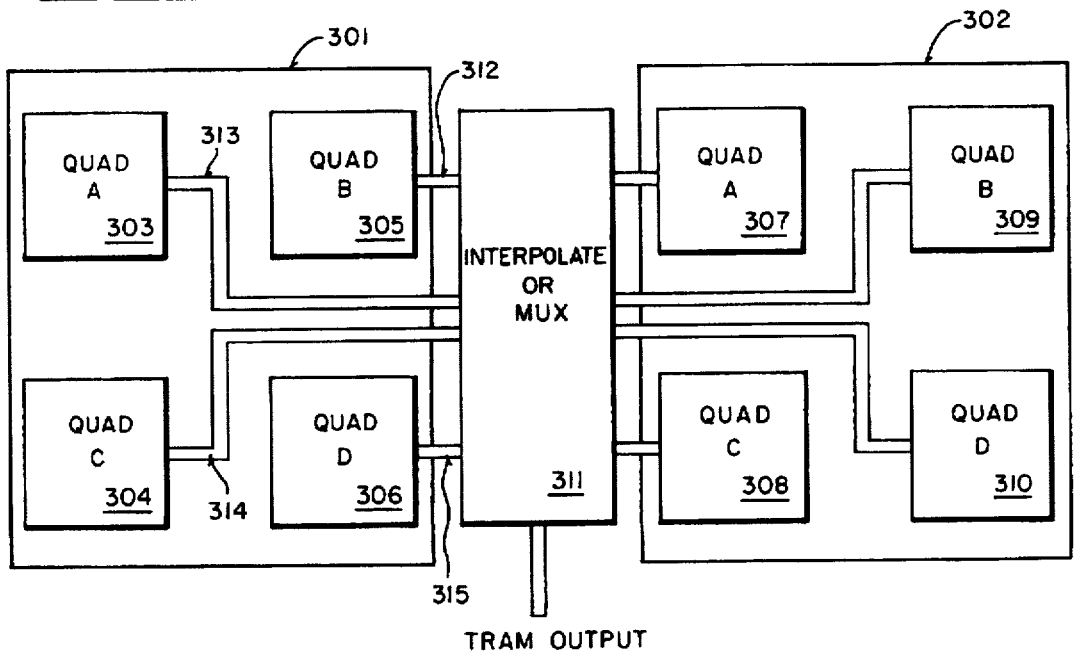
FIG_3

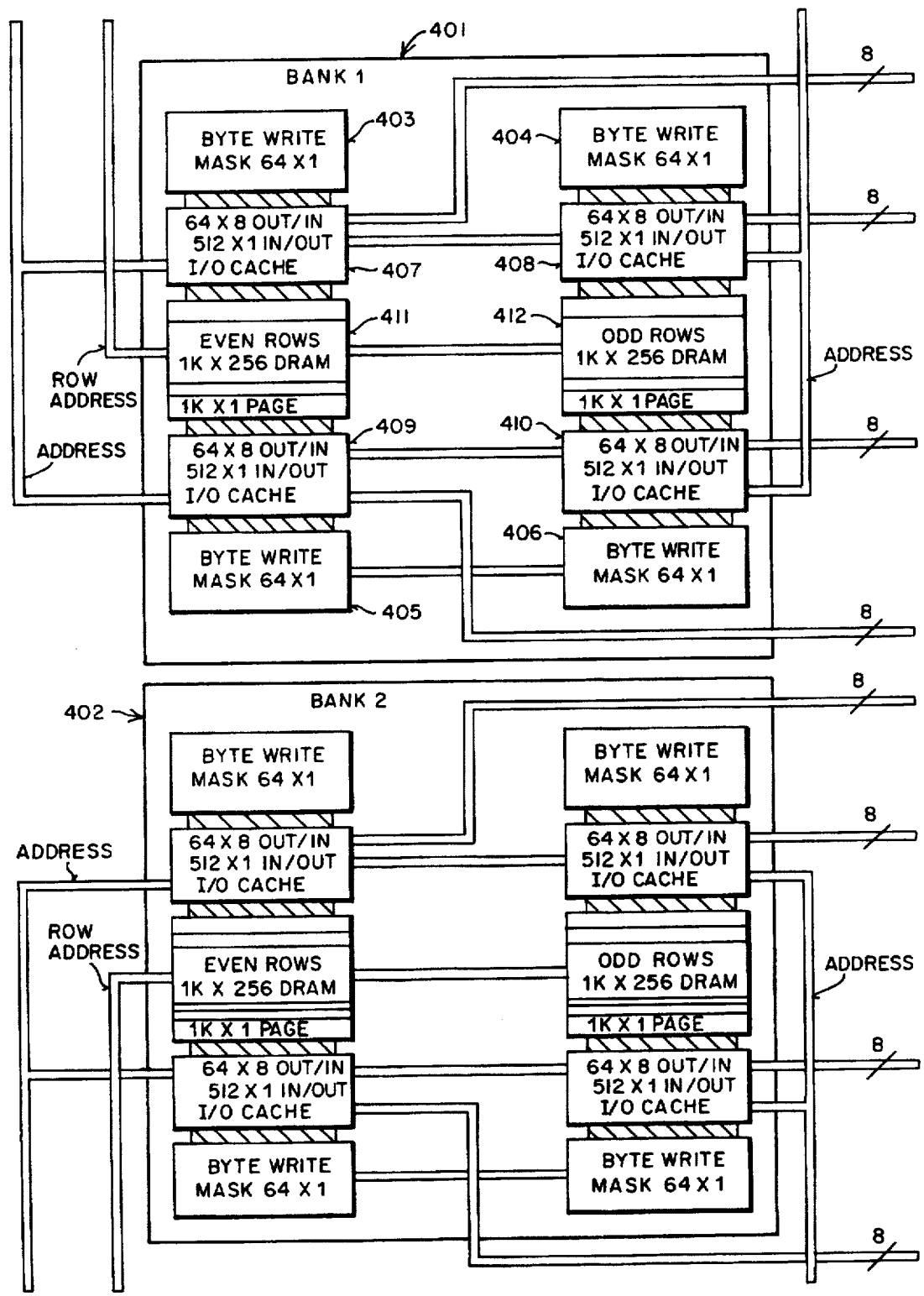

FIG _ 5
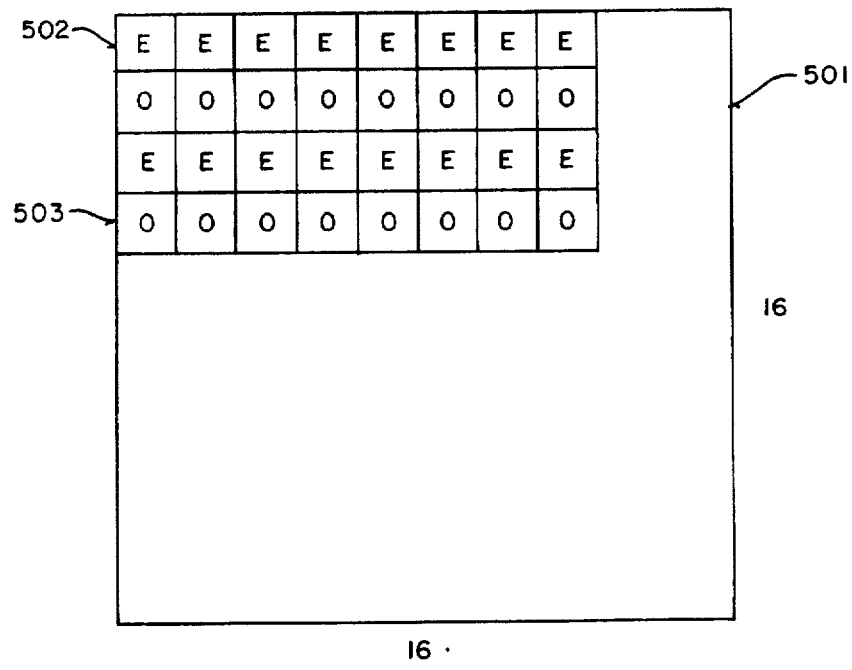
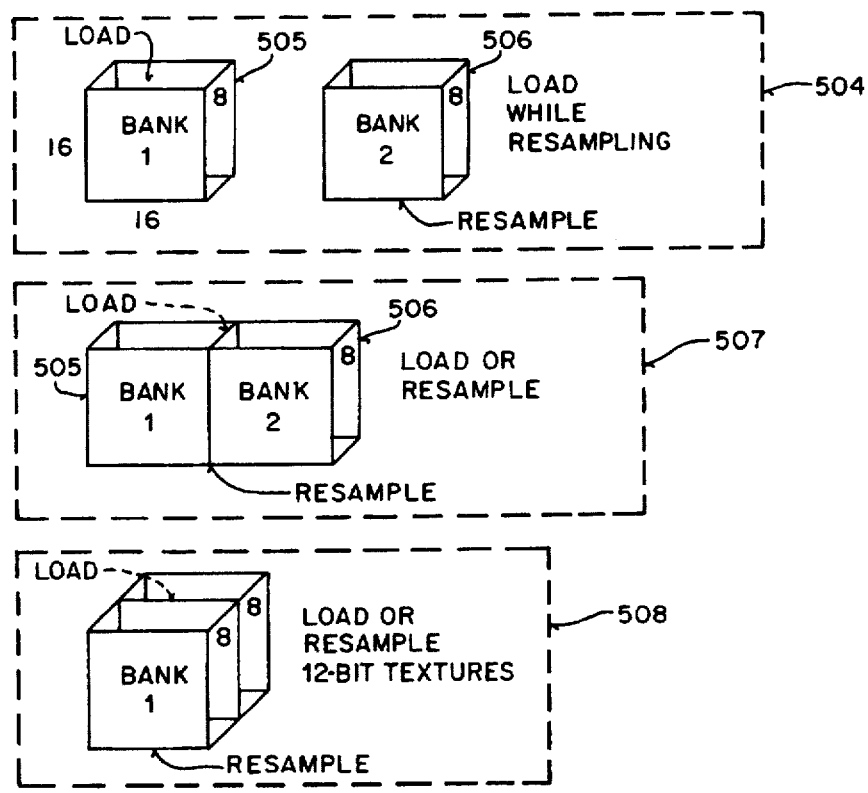

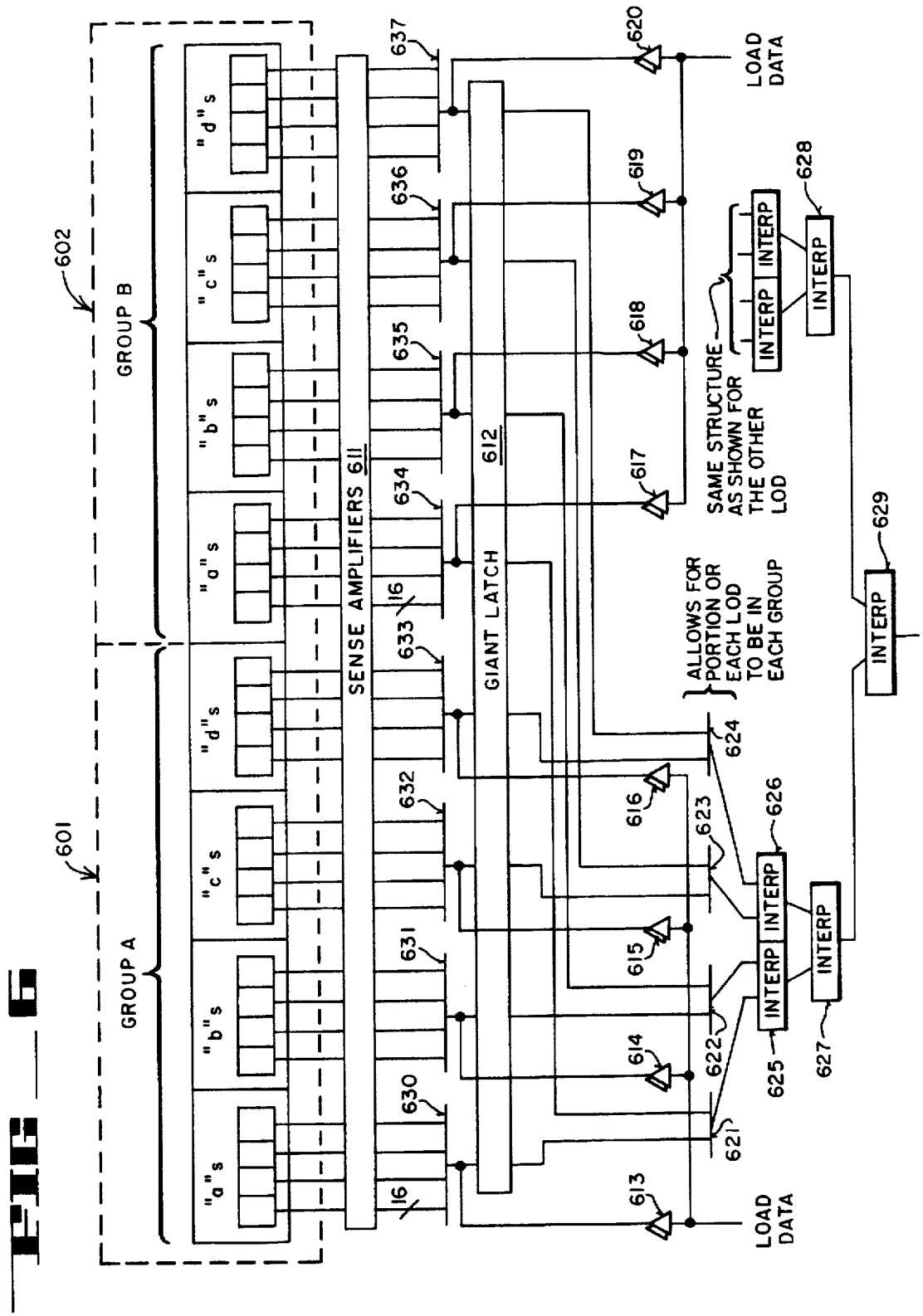
FIG_6

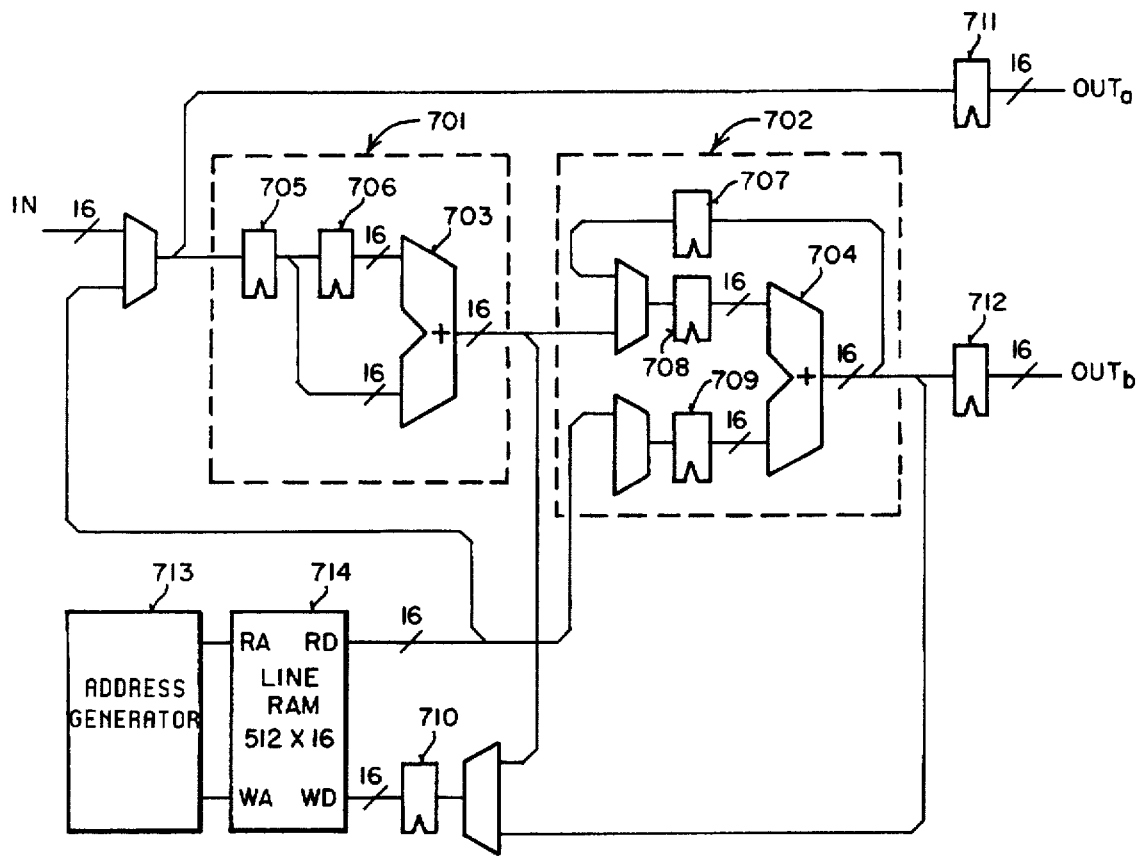
FIG_7
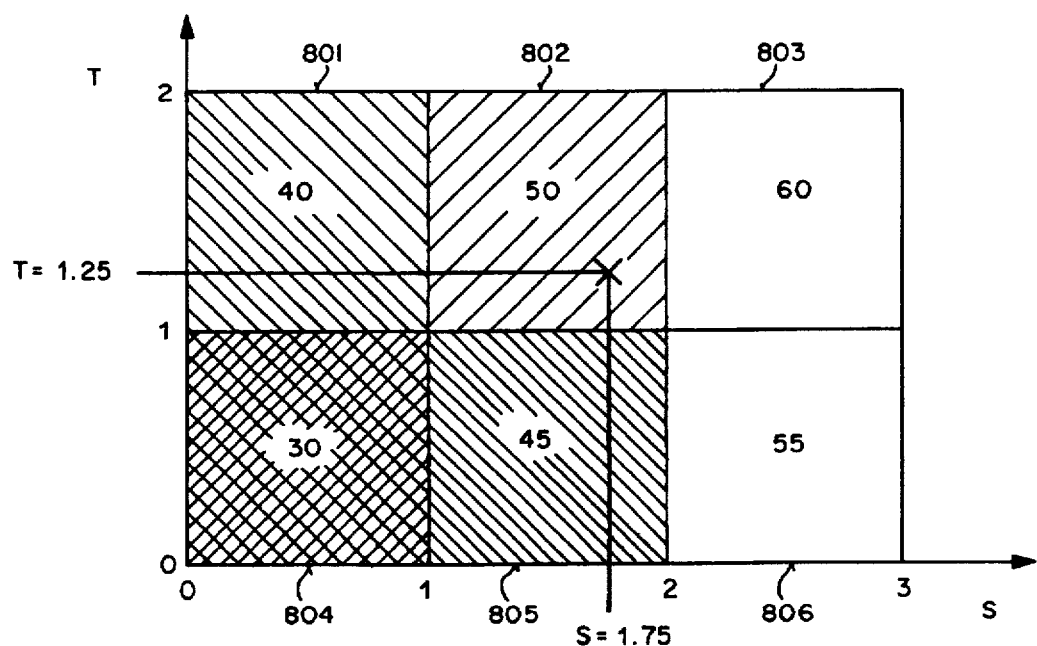
FIG_8

FIG_9
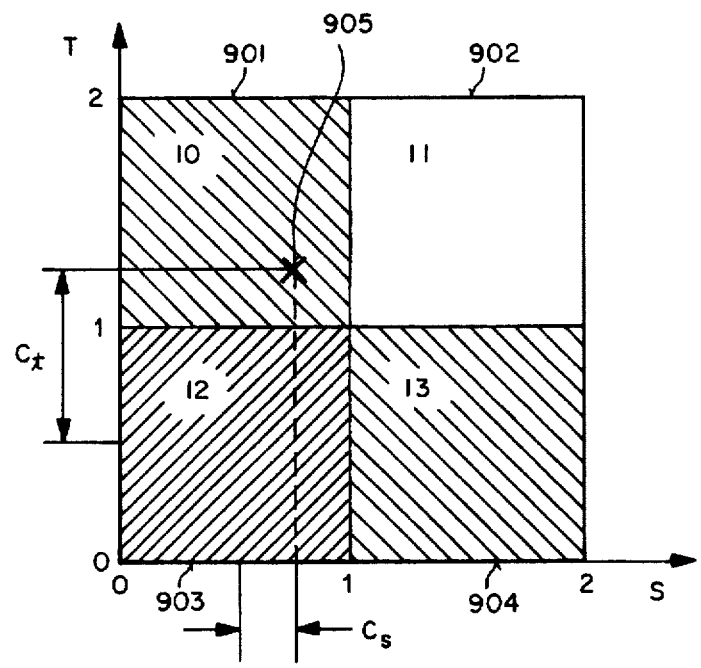
FIG_10
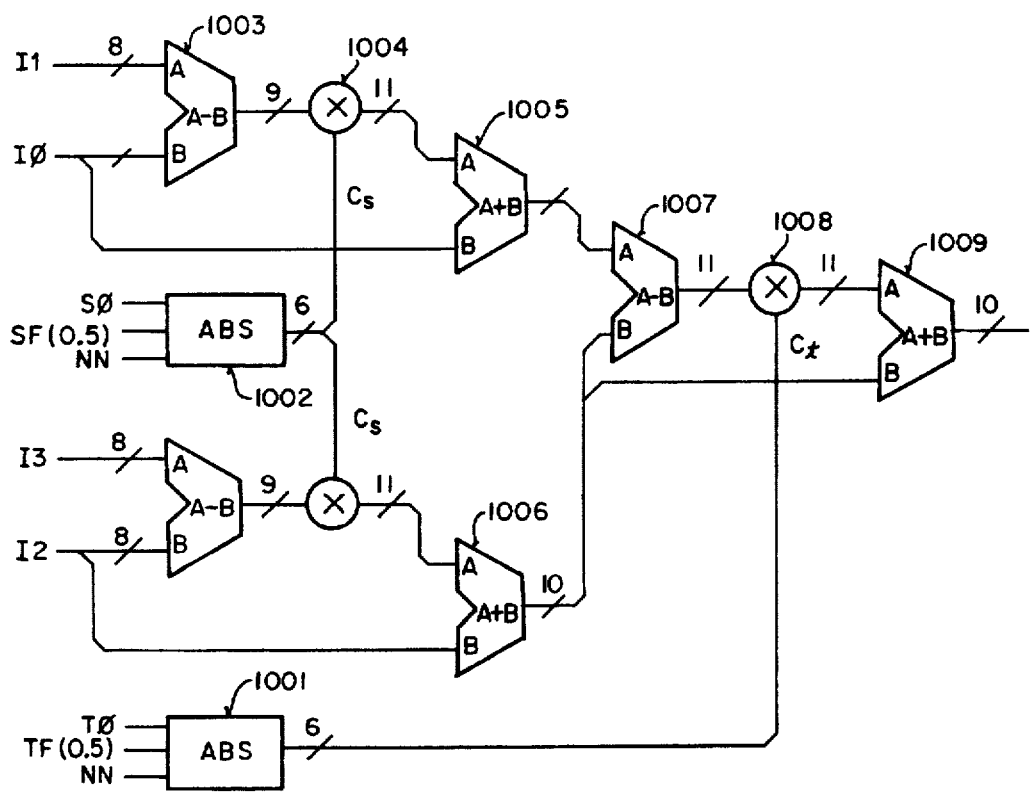

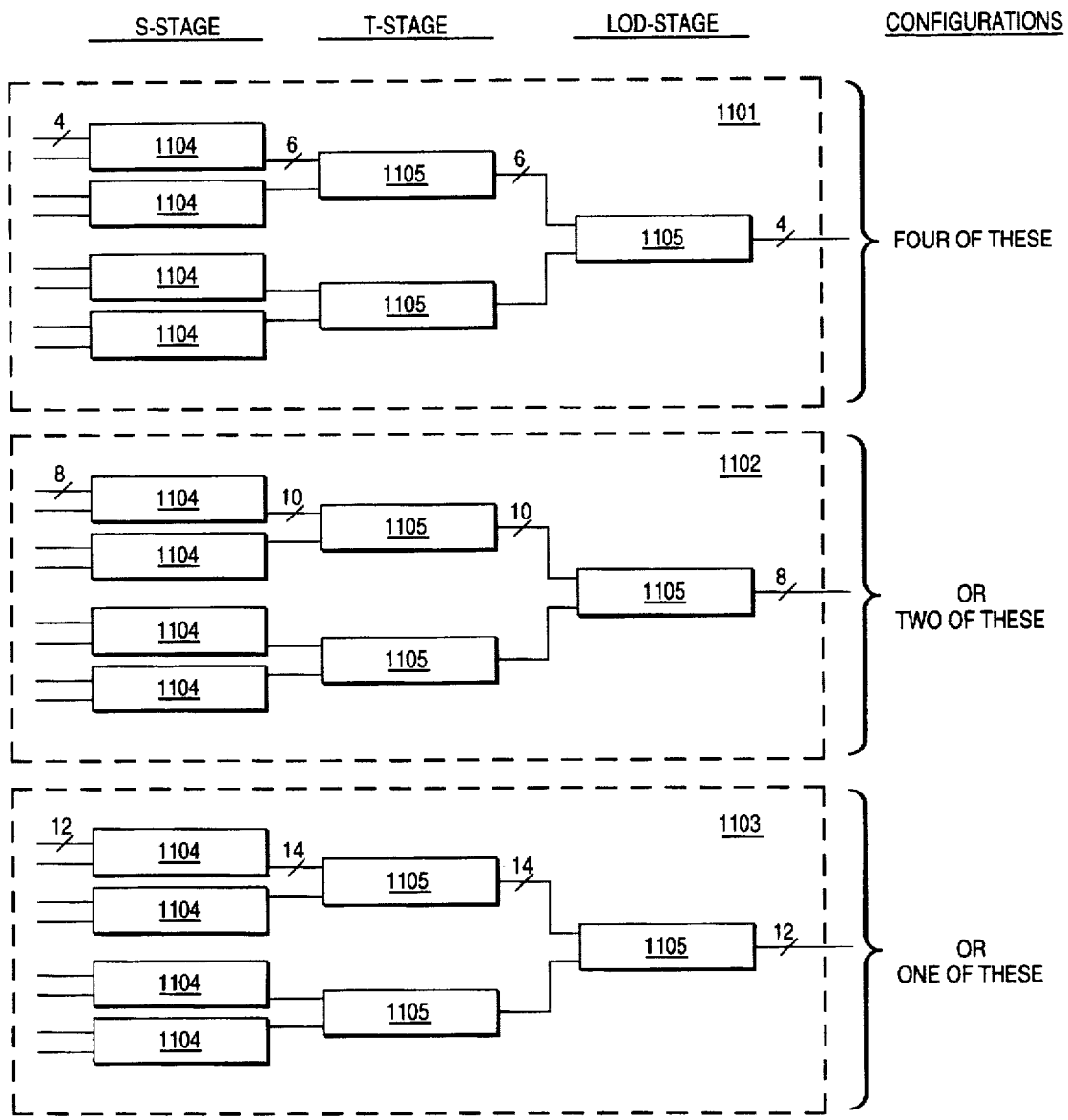

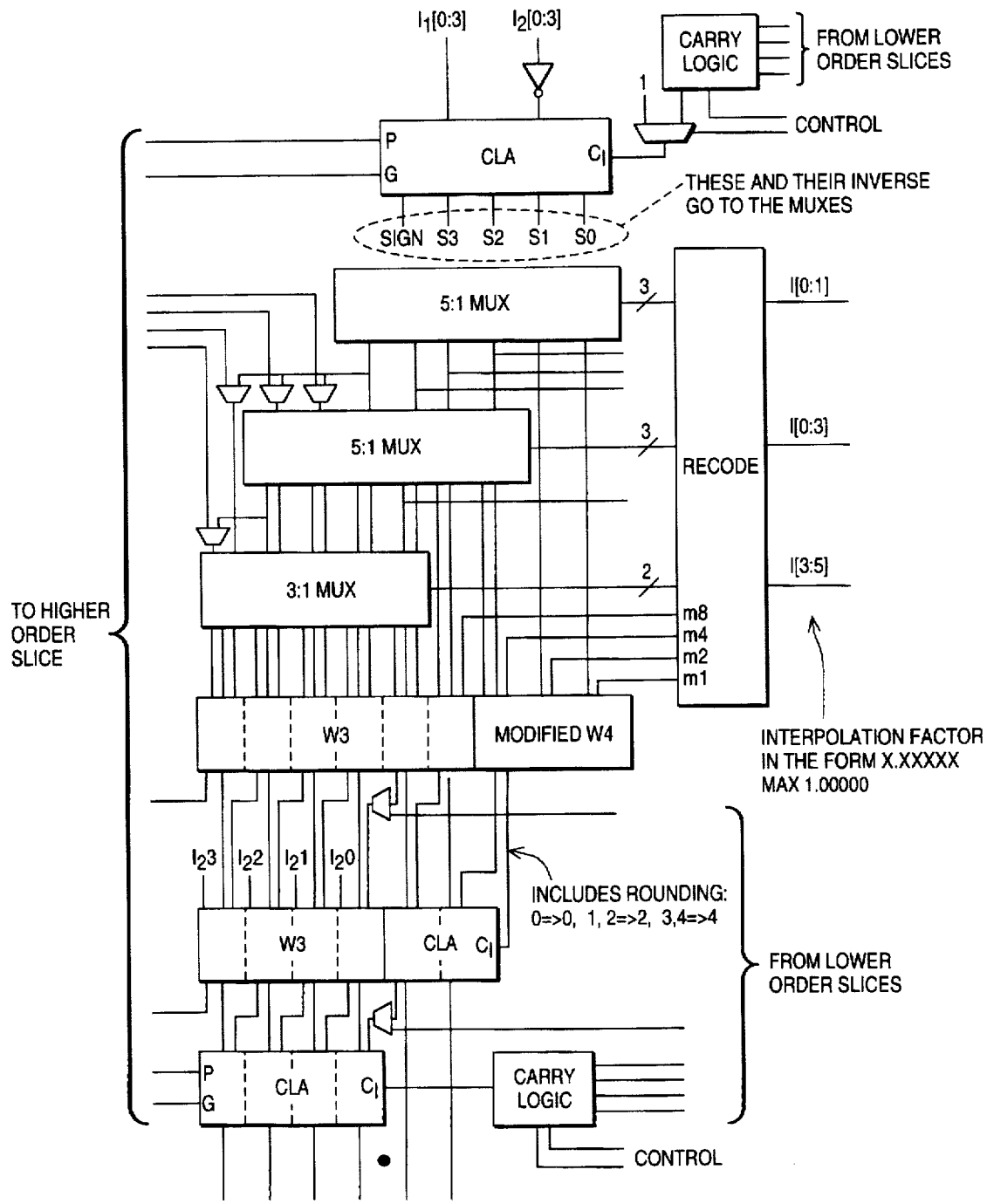
FIG_12

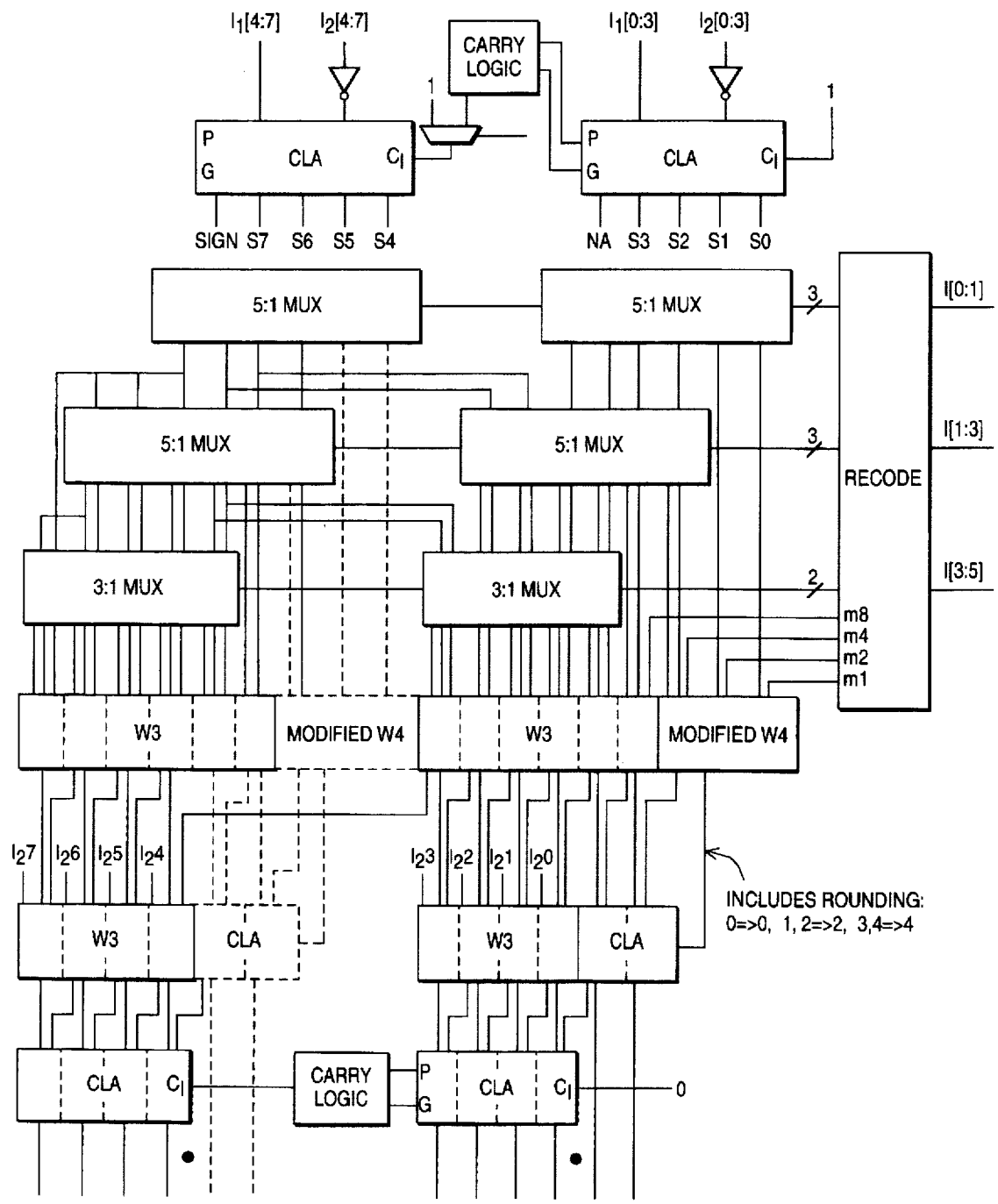

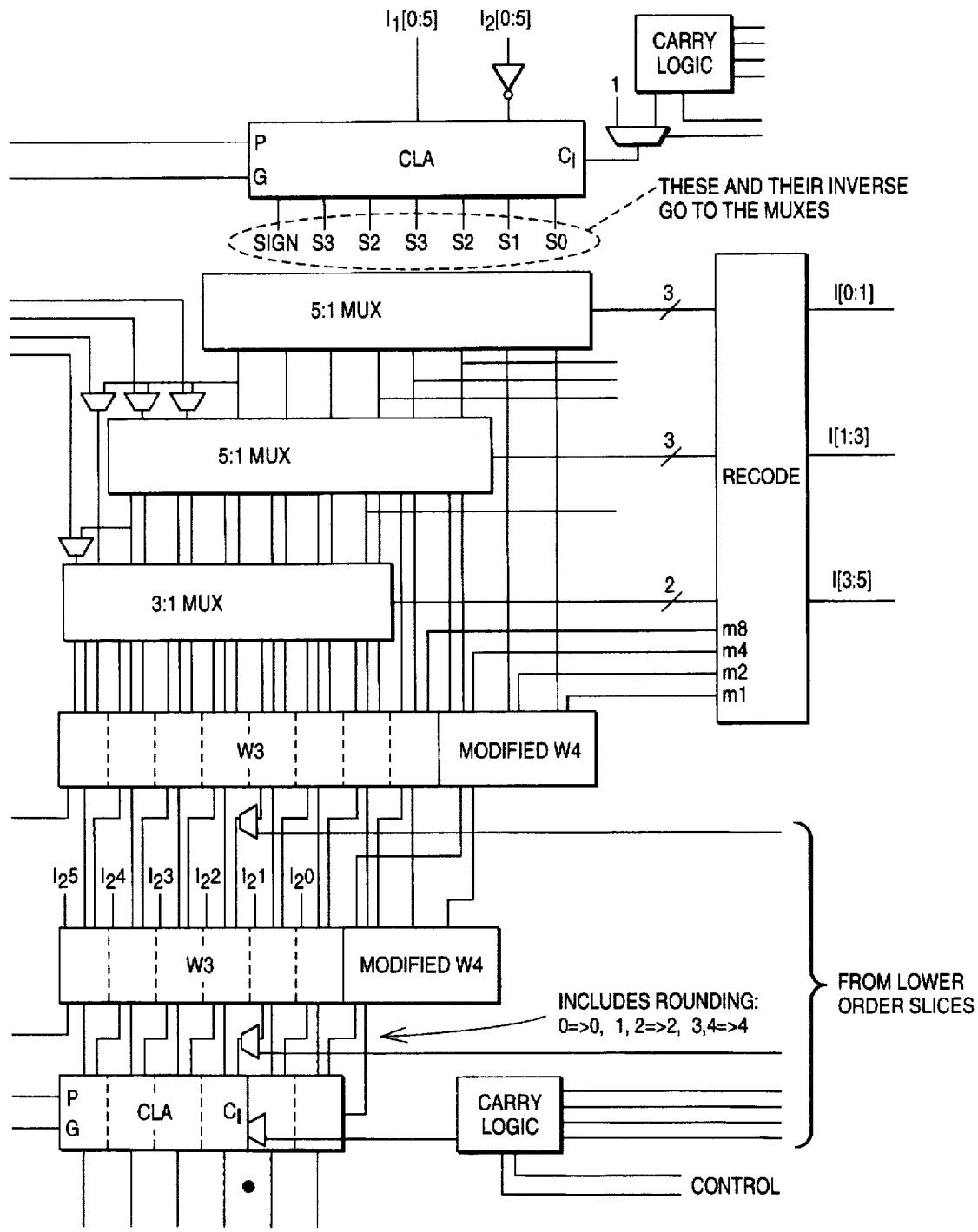
FIG_14

APPARATUS AND METHOD FOR INTEGRATING TEXTURE MEMORY AND INTERPOLATION LOGIC IN A COMPUTER SYSTEM

This is a continuation of application Ser. No. 08/206,959, filed Mar. 7, 1994, now U.S. Pat. No. 5,548,709.

FIELD OF THE INVENTION

The present invention pertains to the field of computer display systems. More particularly, the present invention relates to an integrated texture memory and interpolation logic device used in performing texture mapping in a computer system.

BACKGROUND OF THE INVENTION

Computer systems are commonly used for displaying graphical objects on a display screen. These graphical objects include points, lines, polygons, and three dimensional solid objects. By utitilizing texture mapping techniques, color and other details can be applied to areas and surfaces of these objects. In texture mapping, a pattern image or texture map is combined with an area or surface of an object to produce a modified object with the added detail of the texture map. For example, given the outline of a featureless cube and a texture map defining a wood grain pattern, texture mapping techniques can be used to map the wood grain pattern onto the cube. The resulting display is that of a cube that appears to be made of wood in another example, vegetation and trees can be added by texture mapping to an otherwise barren terrain model. Labels can be applied on computer-modeled package designs for visually conveying the appearance of an actual product. Furthermore, textures mapped onto geometric surfaces provide additional motion and spatial cues that surface shading alone might not be capable of providing. For example, a sphere rotating about its center appears static until an irregular texture or pattern is affixed to its surface.

Texture mapping involves using a texture having a function deemed in texture space. The texture is then warped or mapped into an object space. Typically, a two-dimensional texture or pattern image is mapped onto a three-dimensional surface. This can be accomplished by associating a two-dimensional index (S,T) into an array of texture pixels (texels) in reference to points on the three dimensional surface. As the surface is rendered, the S and T values are interpolated and used to look up a texture value for each rendered pixel. The interpolated S and T values are generally not integer values. Consequently, these values often fall between the texture samples represented by the array of texels.

Several options exist for selecting a texture value, given real S and T values. One of the simplest options is to round S and T to the nearest integers and then select the texel corresponding to the rounded integer values. A more accurate representation is produced by interpolating between the four nearest samples that surround the real (S,T) location. Sometimes, a bi-linear interpolation algorithm is used in other instances, higher-order interpolation algorithms are used for better results.

One potential problem with these unsophisticated selection processes described above is that, if the surface being texture-mapped is far from the viewpoint, severe aliasing of the texture may occur. This undesirable aliasing occurs because the interpolated (S,T) values my skip over large areas of the texture. A prior art technique, referred to as MIP-mapping, address this problem by precomputing multiple, filtered copies of the texture at successively lower resolutions. For example, a 256×256 texel array would be filtered and resampled to obtain maps at 128×128, 64×64, 32×32, 16×16, 8×8, 4×4, and 2×2 resolutions. The particular size of the texel array is chosen based on a computer parameter known as a level of detail (LOD). The LOD represents the relative distances between the interpolated (S,T) values. Each map size represents an integer LOD, and the computed LOD values are real numbers. High quality texture mapping is obtained by performing bi-linear interpolation in the map representing the integer LOD immediately above and below the computed LOD of each pixel. Next, a linear interpolation is performed between the integer LOD's to obtain the texture value at the non-integer LOD. This process is known as tri-linear MIP-mapping.

Another problem is that in high performance computer graphics systems, the rendering operations are typically distributed among a number of processors. If this parallel organization were used to perform texture mapping, each processor would likely contain a Copy of the entire texture map in its associated memory. This multiple storage of the entire texture map is both redundant and inefficient.

Yet another problem is that the transfer of data between the various processors and the memory consumes a great deal of the limited bandwidth. Allocating valuable bandwidth for this function tends to slow down the exchange of other needed information. Hence, the overall effect is that this imposes a heavy burden on the texture mapping process.

Thus, there is a need in prior art computer graphics systems for a fast, accurate, and efficient texture mapping process. It would be preferable of such a process could somehow minimize the mount of bandwidth needed for the texture mapping process. It would also be highly preferable of such a process could be implemented with fewer chips and without redundant texture storage.

SUMMARY OF THE INVENTION

The present invention pertains to a semiconductor chip used in computer systems for performing texture mapping for graphics applications. Various texture maps are input to the semiconductor chip. These texture maps are stored in a memory (e.g., DRAM array). The data for recent texture maps are cached in order to accelerate the reading and writing of texels. A memory controller controls the data Wanslets between the main memory and the cache. Also included within the same semiconductor chip is one or more interpolators. These interpolators produce an output texel by interpolating from the textures stored in memory. The interpolated texel value is output by the semiconductor chip for display. By integrating the texture memory with the integrators onto the same substrate, the transmission bandwidth as well as the redundant storage of texture maps in a multi-processor environment can be minimized.

In the currently preferred embodiment, when the DRAM row is accessed, its contents can be transferred to the cache while simultaneously accessing the cache and cycling the DRAM array again. In other words, memory access cycles can be performed in parallel to reading from a cache. Furthermore, one embodiment of the present invention incorporates fault prediction, whereby future data is retrieved before it is currently needed. In this manner, data transfers can continue without incurring extra delays. In another embodiment, the interpolators are comprised of a number of modular slices which can be sucked to accommodate different data widths as desired.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 shows a block diagram of a computer graphics system upon which the present invention may be practiced.

FIG. 2 shows a block diagram of a texture random access memory (TRAM).

FIG. 3 shows a block diagram of the TRAM memory organization.

FIG. 4 shows a block diagram of two banks of level of detail (LOD) memory.

FIG. 5 shows quad DRAM and cache memories.

FIG. 6 shows a circuit diagram of the TRAM resampling interconnection network.

FIG. 7 shows a block diagram of a mip map generator.

FIG. 8 shows an example of a nearest-neighbor interpolation.

FIG. 9 shows an example of a bi-linear interpolation.

FIG. 10 shows a circuit diagram of an 8-bit bi-linear interpolator.

FIG. 11 shows three examples of different configurations that can be used for the interpolator chains.

FIG. 12 shows a basic 4-bit input interpolation slice.

FIG. 13 shows an 8-bit input interpolator, which is formed by coupling together two 4-bit slices.

FIG. 14 shows a basic 6-bit input interpolator slice.

DETAILED DESCRIPTION

An apparatus and method for integrating texture memory and interpolation logic for performing texture mapping in a computer display system is described. In the following description, for purposes of explanation, numerous specific details are set forth, such as memory sizes, cache architecture, interpolation schemes, etc., in order to provide a thorough understanding of the present invention. It be obvious, however, to one skilled in the art that the present invention may be practiced without these specific details. In other instances, well-known structures and devices are shown in block diagram form in order to avoid unnecessarily obscuring the present invention.

Overview of a Computer System Upon Which the Present Invention May Be Implemented Referring to FIG. 1, a computer graphics system upon which the present invention may be practiced is shown as 100. System 100 can include any computer controlled graphics systems for generating complex or three-dimensional images, such as the IRIS™ family of computers manufactured by Silicon Graphics, Inc. of Mountain View, Calif. Computer system 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

Aim coupled to bus 101 is a graphics subsystem 111. Processor 102 provides the graphics subsystem 111 with graphics data such as drawing commands, coordinate vertex data, and other data related to an object's geometric position, color, and surface parameters. The object data is processed by graphics subsystem 111 in the following four pipelined stages: geometry subsystem, scan conversion subsystem, raster subsystem, and a display subsystem. The geometry subsystem converts the graphical data from processor 102 into a screen coordinate system. The scan conversion subsystem then generates pixel data based on the primitives (e.g., points, lines, polygons, and meshes) from the geometry subsystem. The pixel data is sent to the raster subsystem, whereupon z-buffering, blending, texturing, and anti-aliasing functions are performed. The resulting pixel values are stored in frame buffer 109. The display subsystem reads the frame buffer 109 and displays the image on display monitor 121.

Furthermore, a data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Another device which may be coupled to bus 101 is hard copy device 124 which may be used for printing instructions, data, or other information on a medium such as paper, film, or similar types of media. Additionally, computer system 100 can be coupled to a device for sound recording and/or playback 125, such as an audio digitizer coupled to a microphone for recording information. Further, the device may include a speaker which is coupled to a digital to analog (D/A) converter for playing back the digitized sounds.

Custom Texture Random Access Memory

In the present Invention, the texture memory, interpolation and resampling logic associated with texture mapping is integrated onto a single chip, called the custom texture random access memory (TRAM). In other words, the TRAM circuits (e.g., texture memory such as DRAM and cache, interpolation logic, resampling logic, etc.) all reside on a same substrate of a chip. This TRAM design offers several advantages. First, by interpolating on chip, the number of data output pins as well as support chips that are need is minimized. For example, each TRAM, for an 8-bit case, only needs an 8-bit data output. The results are sent directly to the graphics rasterizer. Furthermore, by using the densest dynamic random access memory (DRAM) technology, multiple DRAMs can be created on-chip. This provides texel address Independence for performing mip map resampling, along with large texture capacity without redundant texture storage. And by caching the DRAM rows, DRAM access are run In parallel with resampling. In addition, the address and data are pipelined for Increased throughput.

FIG. 2 shows a block diagram of the TRAM 200. The input address and data on line 201 are Input to the mip map generator 202 and the memory control and address Interface 203. Once the mip maps have been generated, it is buffered by input buffer 204 before being stored by the DRAM array 205. In addition, read and cache addresses are input to the memory control and address interface 203 on 206 and 207. The memory control and address interface 203 controls the DRAM array 203 and the read cache 208. Sub-texel and LOD dam are used in conjunction with the mip maps contained in the read cache 208 by interpolator 209. The interpolator 209 resamples the texture image to produce the output samples, which are sent to the graphics rasterizer. These blocks are described in greater detail below.

FIG. 3 shows a block diagram of the TRAM memory organization. Basically, the TRAM memory is comprised of the DRAM array and the static random access memory (SRAM) cache, which are divided into two groups of parallel LOD memories 301 and 302. Each group allows for a 2×2 texel area from each of the IDD's in order to perform tri-linear resampling. Each of these two groups has four independent "quads" 303–306 and 307–310 of memory. Dividing the LOD memory into quads allows for texture traversal for minimizing cache thrashing at the image boundaries. A double buffered load port is implemented so that the loading buffer can occur in parallel with the DRAM write cycle.

In the currently preferred embodiment, the DRAM and the I/O caches are separated into the four quads. The effect is that as a span or line is traversed during a resampling operation, the I/O caches are accessed up to four 8-bit texels from a single quad to create the sample for each LOD. These samples are then blended/mixed by the interpolate/mux block 311 for output to the graphics rasterizer.

Note that the four quads of each group have independent addressing as shown by the four buses 312–315. Hence, each of the quads can walk in the scan direction, prefetching data that will be needed along the scan path. The graphics rasterizer monitors the page address in a pipeline and pre-determines whether a page fault will occur. It will then start the access to the necessary data to avoid the fault (i.e., fault prediction). By the rime the address reaches the end of the pipe, where it is used to resample from the TRAM cache, the data is already available from the DRAM array.

FIG. 4 shows a block diagram of two "banks" 401–402 of LOD memory. These two banks represent 1 Meg×8 quads of memory. Bank 401 is comprised of four 64×1 byte write masks 403–406; four 64×8 out/in 512×1 in/out I/O caches 407–410; a 1K×256 even rows DRAM 411; and a 1K×256 odd rows DRAM 412. Similarly, the second bank 402 is comprised of blocks identical to the first bank 401.

These two banks allow for a "ping-pong" mode, wherein load and resampling performance are decoupled (i.e., full performance on both ports). This feature is provided for 4-bit and 8-bit textures. In the currently preferred embodiment, flexibility is provided in the Configurations for each LOD. This allows for either ping-ponged 4-bit or 8-bit banks, spatially larger 4-bit or 8-bit banks, or the combination of the two banks to increase the texel depth (e.g., 12 bits). For non-mip mapped applications, up to a 1K×1K×8-bit texture map can be stored.

FIG. 5 shows the different ways in which the DRAM and cache memories can be organized for a given quad. The 16×16 array 501 represents one of the 128×8 bytes in each 1K DRAM. Array 501 can be a page in a quad belonging to either of the two banks. Row 502 represents an even 1K DRAM, while row 503 represents an odd 1K DRAM.

Configuration 504 shows the two banks 505 and 506 used in the ping-pong mode as described above. In one embodiment, banks 505 and 506 have a 16×16×8-bit size. In another embodiment, these two banks can be configured to a 16×32+4-bit size. Note that in the 4 and 8-bit modes, parallelized loading and resampling can be performed to the same TRAM for ping-pong mode. This allows independent operation and utilizes resampling resources (e.g., column decode, I/O cache, etc.).

Alternatively, the two banks 505 and 506 can be placed side-by-side in series as shown in configuration 507. This configuration 507 provides for a spatially larger contiguous memory. In yet another embodiment, the two banks are placed in a paralleled configuration 508. Configuration 508 allows for a deeper memory for storing texel depths of up to 16 bits.

When sampling is performed at the middle of an image, data is needed from both banks. However, the retrieved data is found in complementary quads, so that all of the data is available simultaneously. With non-mip mapped and non-enabled borders, the data at these boundaries will come from the other group. When either mip mapped or when borders are enabled, each bank will hold this border data in its border store. When mip mapping is enabled or borders are enabled, operation will be consistent (i.e., data at borders win come from the same group).

The memory control and address interface 203 of FIG. 2 controls the DRAM arrays and also controls the sharing of the DRAM array for non-ping pong modes, as the load and resampling ports require the same DRAM resource. This interface is used in swapping of the two banks in ping-pong modes. Interface 203 interfaces the addresses from the graphics rasterizer to the row addresses for each DRAMs. This includes double buffered page address registers for each DRAM for parallel DRAM access and page address register loading. In addition, the memory control and address interface stores and increments the load port DRAM page address for single image or mip map generation.

An interconnection network connects the quads to the interpolators and the data input logic. In the interpolation process, the four quads of a given group are multiplexed. These results are then made available to each interpolator (i.e., they are multiplexed at its inputs). The two levels of muxing allows the entire array to be used as one large image or as two independent LODs. Border dam originates from the same group, but is stored in an opposite quad from the image edge data (e.g., horizontal edges are stored in AB<→CD; vertical edges are stored in AC<→BD). In either case, each LOD is split between the two groups. LODs which are smaller than 16×16 can wrap because: 1) the other horizontal half is in the other group so that quad "a" and quad "b" data from the same 16×16 area is not needed, hence, they will always be contiguous and 2) the vertical quad "ab" and quad "cd" addresses are independent so that any two lines can be read from the same 16×16 cache.

FIG. 6 is a circuit diagram of the TRAM resampling interconnection network. Two groups 601 and 602 of memory, each having four quads "a's-d's" 603–606 and 607–610 are coupled to sense amplifiers 611. The sense amplifiers 611 are used to amplify the weak signals from the two group's DRAM data lines. A giant latch 612 is used to pipeline the data after the first level of muxing. Four 2:1 multiplexers 621–624 are used to allow a portion of or each LOD to be stored in each group. Thus, the coefficients to the interpolators 625 and 626 provides for the muxing of two inputs. The outputs from interpolators 625 and 626 are in turn interpolated by Interpolator 627. A similar structure exists for the other LOD. A final interpolator 629 is used to interpolate the results from both LODs as output from the Interpolators 627 and 628.

For loading the TRAM, two LODs are simultaneously sent, when using the mip map generator, to either group 601 or 602 and to any texel location within that group. Since the 4:1 multiplexers 630–637 are comprised of bi-directional transmission gates, they can either be used for resampling or writing rexels. When storing borders, as with resampling, the data is stored to the appropriate memories. When borders or mip mapping is enabled, the center border is stored twice, once in each group. A number of drivers 613–620 are used in loading data to the DRAMs. Two drivers are associated with each input line so that the two bytes of data can separately be enabled.

The mip map generator 202 as shown in FIG. 2 can create an entire mip map for complete images. The load input of the TRAM allow the texture to be loaded in a rectilinear fashion. For tiled inputs, the mip map generator can filter the input tile down to a minimum of one texel. The mip map generator can be bypassed if it is necessary to explicitly load the mip map levels as would be the case if a user-defined filter is to be applied to cream the mip maps (e.g., CPU generated).

In the currently preferred embodiment, the mip map generator performs a 2×2 box filter (i.e., averaging filter) to produce each texel for the next rougher mip map level. A box filter eliminates most of the high frequencies that would cause aliasing, but it is not a very sharp filter. The mip map generator handles 4, 8, and 12-bit images as well as four 4-bit and two 8-bit images for a single TRAM configuration. With multiple TRAMs, the mip maps are generated and stored in parallel.

FIG. 7 shows a block diagram of a mip map generator. The input stage 701 performs the horizontal filtering on the fine LOD level. The second stage 702 takes the results from the input stage 701 and generates an output and temporary results for LODs further down the mip map. The adders 703 and 704 can be used as four 4-bit adders in parallel, two 8-bit adders, or one 12-bit adder, depending on the selected texel mode. These two adders 703 and 704 basically averages, with truncation, two values by adding then dividing by two. In one instance, two 4-bit numbers are input to produce a 4-bit result in other instances, 8 and 12-bit numbers are input to the adders to produce 8 and 12-bit results. The width of these adders need only be as wide as the data. Since 4-bit (1 to 4 components), 8-bit (1 or 2 components), or 12-bit data are supported, four 4-bit adder slices are implemented. These four 4-bit adder slices can be combined to create 8 or 12-bit adders. A number of line stores 705–710 are used for temporarily storing interim processing results. Line stores 711 and 712 are used to temporarily store the outputs from the mip map generator. The address generator 713 and the 512×16 line RAM 714 are used to read/write addresses and data W/from the mip map generator.

All components are input, processed and stored to DRAM in parallel. Hence, the only difference is the carry circuitry at the adders. The RAM allows for larger line length, so the two and four TRAM configurations allow for larger image lines which goes along with increases in texture RAM capacity.

In the currently preferred embodiment, mip maps and borders are stored in TRAM in a contiguous array of TRAM blocks. The size of these blocks are either 8Kbits or 16Kbits, depending on whether banks 1 and 2, in each LOD's memory, are used together or not. The basic unit of memory allocation is 8Kbits. This allows for the following combined page/cache sizes: 1) 32×32×12 bits, where banks 1 and 2 always used together—16Kbits; 2) 32×32×8 bits or 32×64×4 bits, with two banks for ping-ponging—8Kbits each; and 3) 64×32×8 bits or 64×64×4 bits, with one bank for large single images—16Kbits.

There is a BASE offset register that is used to specify the starting address of the image data. Hence, all mip map and border offsets are relative to the base. These offsets do not change if the image were put in a different part of TRAM at some later time. To provide for more efficient utilization of TRAM when borders are being used or when many small textures are bound, borders and small mip maps are packed whenever possible into the same page. Each mip map and each border for each mip map has a table entry for the relative offset from the BASE address to the start of that data. The offsets include sub-block address bits so that mip maps and borders do not have to be aligned to page boundaries. For example, the 16×16, 8×8, 4×4, 2×2, and 1×1 map levels can be stored together in one memory page. In addition, the borders can be similarly packed.

The mip map Interpolators 209 of FIG. 2 resamples the texture image to produce the output samples. The goal is to approximate as closely as possible what the texture image pixel value would have been, at the location requested, if a continuous texture image were given. Low pass filtering is implemented to minimize aliasing. The Interpolation circuit generates the approximation while the mip map generator handle the low pass filtering.

The hardware performs a "nearest-neighbor/point sample" (NN) or bi-linear interpolation on each mip map level. For NN resampling (sometimes called "point" or "nearest" mode), if the (S,T) coordinate falls within a texel's boundary after truncation, that level's sample is assigned the intensity of the corresponding texel. FIG. 8 shows an example of nearest neighbor resampling. Six rexels 801–806 having intensities of 40, 50, 60, 30, 45, and 55, respectively, are shown. Given a texel coordinate of (S,T)=(1.75,1.25), its NN output corresponds to texel 802, and an intensity of 50 will be used. This nearest neighbor sampling scheme produces a blocky appearance when the image is magnified. It also produces more edge aliasing when an edge in the image is rotated with respect to the screen pixels (i.e., jaggies). Consequently, bi-linear filtering is used to "smooth out" these effects.

In bi-linear resampling, a two dimensional Interpolation is performed. The Intensity of the texels having the four nearest centers are used. FIG. 9 illustrates an example of bi-linear resampling. Four texels 901–904 are shown respectively having four intensities I0–I3. The intensity for point 905 is given by the following equation: I=Ct( (Cs(I1−I0)+I0)−(Cs(I3−I2)+I2) )+(Cs(I3−I2)+I2), where Cs and Ct are the offsets between the (S,T) coordinates of texel 901. Hence, the output intensity resulting from the bi-linear resampling is a function of the four intensities I0–I3.

FIG. 10 shows a bi-linear resampling circuit diagram. The ABS blocks 1001 and 1002 output the absolute values of the S, T, or LOD value to compensate for the fact that whether the sample location is on the right or left of a texel, the texel goes to the same input of the interpolator. These absolute values make the coefficient track the texel dam. The output from ABS block 1001 gives the value of Ct, and the output from ABS block 1002 gives the value of Cs. Subtractor 1003 performs a subtraction function on the intensities I0 and I1. Multiplier 1004 multiplies this result by Cs. Next, adder 1005 adds I0, thereby resulting in an output of Cs(I1–I0)+I0. In similar fashion, the output from adder 1006 is Cs(I3–I2) +I2. Subtractor 1007 subtracts the output of adder 1006 from the output of adder 1005. This gets multiplied by Ct by multiplier 1008. Lastly, the output from multiplier 1008 is added to the output from adder 1006, which results in the bi-linear sampled intensity.

Once these resamplings are completed, the hardware either selects between one of these schemes or linearly interpolates between them to create the output sample. These results then get interpolated in the mip map generator block. Both nearest neighbor and bi-linear filtering still apply when using a mip map. These filters are performed on one or two map levels, depending on the filter selected. Each TRAM interpolates 1 (4 TRAM configuration), 2 (2 TRAM configuration), or 4 (single TRAM configuration) components. For other types of formats, the texel color values are truncated to fit into the available texel depth.

It has been determined that to maintain error at less than ±1.0 LSB at the LOD interpolator output, the two fraction bits kept and rounding is performed using the third, at the output of the multiply is necessary. Maintaining two fraction bits builds error to ±¾ in the currently preferred embodiment, each linear interpolator is "sliced" to allow for 4, 8 or 12-bit data. The first stage of interpolators only need to handle 4-bit input data, The second and third stages are comprised of a slice that handles 6-bit input data.

FIG. 11 shows three examples of different configurations that can be used for the interpolator chains in the first configuration, four of the 4-bit untt 1101 can be stacked to perform 16-bit tri-linear interpolations. In the second configuration, a pair of the 8-bit unit 1102 can be stacked to perform the 16-bit tri-linear interpolations. In the third configuration, a single 12-bit unit 1103 is used to perform the interpolations. A number of multiplexers are programmed to couple the various units in order to achieve the desired configuration. In this manner, the same hardware can be utilized with minimal extra gate count to attain the flexibility in data width. In some applications, greater precision and resolution are desirable, Whereas, in other applications, speed and cost are of greater importance.

In the currently preferred embodiment, the units 1101–1103 are comprised of an S-stage, a T-stage, and an LOD-stage. The S-stages are comprised of 4-bit slices 1104. The T-stages and LOD Stages are comprised of 6-bit slices 1105. These slices are designed to make the interpolators modular. FIG. 12 shows a basic 4-bit input interpolation slice.

The data to the muxes comes from the subtractor (not shown). The most significant (MS) bits are either sign extension (if the slice is being used as the MS slice) or are the low order bits from the next more significant slice (when not the most significant slice). Since each slice handles both a sign bit and its extension, as well as fraction bits, these capabilities are disabled or bypassed as appropriate for the position of the slice in the larger word. For example, for 8-bit texels, the MS slice would handle the sign bit (and no fraction bits) and the least significant (LS) slice would handle the fraction bits (but no sign). The slice configuration muxes separately enable or disable the slices MS portion (sign extension) or LS portion (fraction). FIG. 13 shows an 8-bit input interpolator, which is formed by coupling together two 4-bit slices. FIG. 14 shows a basic 6-bit input interpolator slice.

The adders and subtractors are split into carry look-ahead adders (CLAs) that have looked ahead across the slices to allow for the desired combinations. The multipliers use a modified Booth (e.g., bit pair recoding) followed by a Wallace tree, whereby the input from the subtractor will be combined in the final stage of the Wallace tree. The multiplier is constructed such that the entire interpolator slice may be combined to form the higher precision versions. The multiply is I*(Sa[0:5]+Sb[0:5]+Sc[0:5]+Sd[0:5]). This allows the individual nibbles to be interpreted separately or shifted appropriately and added, to create either 4-bit, 8-bit or 12-bit results (e.g., for the 6-bit slices). "T" is the 6-bit interpolation value (multiplier in this case). This basic multiplier is thus 7×6. Because the multiplier ("T") is the same across each group of four slices, the same recode logic can be used across groups of four slices.

In the currently preferred embodiment, instead of combining the results after they have individually been computed, an approach is taken that uses multiplier slices that can be connected, in parallel, for the wider precision. This prevents requiring full precision (6+4=10 bits) in each slice and eliminates the final stage of adders that would be required.

Thus, an integrated texture memory and interpolation logic device used in performing texture mapping in a computer display system is disclosed.

What is claimed is:

1. A computer system having semiconductor chip for performing texture mapping, said semiconductor chip comprising:

an input configured to input texture mappings to said semiconductor chip;

a cache memory coupled to said input, said cache memory configured to store texture mapping data;

an interpolator coupled to said cache memory for producing an output rendered pixel by interpolating from a texture mapping stored in said cache memory; and an output coupled to said interpolator for outputting said output rendered pixel, wherein said input, said cache memory, and said interpolator reside on a single substrate device.

2. The computer system of claim 1, further including a main memory, coupled to said interpolator, said main memory is external to said semiconductor chip and is configured to store texture mappings; and a memory controller coupled to said cache memory and said main memory, said memory controller configured to perform memory access cycles to said main memory in parallel with read cycles to said cache memory.

3. The computer system of claim 2, wherein said main memory and said cache memory are divided into at least two independently addressable banks to decouple loading and resampling operations.

4. The computer system of claim 3, wherein said semiconductor chip includes a fault predicting device residing on said substrate, said fault predicting device configured to predict faults by determining data that will be required and fetching said data before said data is required.

5. The computer system of claim 4, wherein the interpolator includes of a plurality of modular slices configured to be stacked to generate interpolations for different data widths.

6. The computer system of claim 5, wherein said interpolator is configured to perform a nearest neighbor selection of a texture mapping to produce said output rendered pixel.

7. The computer system of claim 6, wherein said interpolator is configured to perform a bi-linear interpolation of a texture mapping to produce said output rendered pixel.

8. The computer system of claim 9, wherein said semiconductor chip further includes a filter device coupled to said input, said filter device configured to filter a texture mapping prior to storing said texture mapping in said cache memory.

9. The computer system of claim 8, wherein said filter device is comprised of a 2×2 box filter.

10. A method for performing texture mapping, said method comprising the steps of:

storing texture mapping data on a cache memory residing on a semiconductor chip;

producing an output rendered pixel via an interpolator interpolating from a texture mapping stored in said cache memory, said interpolator residing on said semiconductor chip; and outputting said output rendered pixel from said semiconductor chip.

11. The method of claim 10, further including the step of performing memory access cycles to a main memory, external to said semiconductor chip, in parallel with read cycles to said cache memory.

12. The method of claim 11, further including the step of dividing said main memory and said cache memory into at least two independently addressable banks to decouple loading and resampling operations.

13. The method of claim 12, further including the step of predicting faults via a first device residing on said semiconductor chip, wherein said faults are predicted by determining data that will be required and fetching said data before said data is required.

14. The method of claim 13, wherein the interpolator includes a plurality of modular slices configured to be stacked to generate interpolations for different data widths.

15. The method of claim 14, further including the step of said interpolator performing a nearest neighbor selection of a texture mapping to produce said output rendered pixel.

16. The method of claim 15, further including the step of said interpolator performing a bi-linear interpolation of a texture mapping to produce said output rendered pixel.

17. The method of claim 16, further including the step of filtering a texture mapping prior to storing said texture mapping in said cache memory.

18. The method of claim 17, wherein said filtering is performed utilizing a 2×2 box filter.

* * * * *